United States Patent
Oltedal et al.

(10) Patent No.: US 6,611,694 B1
(45) Date of Patent: Aug. 26, 2003

(54) ARRANGEMENT FOR IMPROVING THE SPEECH QUALITY, ESPECIALLY FOR VOIP (VOICE OVER IP) CALLS

(75) Inventors: Einar Oltedal, Kolbjørnsvik (NO); Harald Johansen, Rykene (NO); Johan Karoly Peter Galyas, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/522,994

(22) Filed: Mar. 9, 2000

(30) Foreign Application Priority Data

Mar. 10, 1999 (NO) .............................. 19991169

(51) Int. Cl.[7] .............................. H04B 1/38; H04M 1/00; H04L 12/28
(52) U.S. Cl. .................. 455/560; 455/561; 455/422; 370/351; 370/352
(58) Field of Search ................................ 455/560, 561, 455/422, 63, 67.1; 370/351, 356

(56) References Cited

U.S. PATENT DOCUMENTS 6,061,566 A * 5/2000 Friman
6,295,302 B1 * 9/2001 Hellwig et al.
6,324,402 B1 * 11/2001 Waugh et al.

FOREIGN PATENT DOCUMENTS

| WO | WO95/15665 | 6/1995 |
| WO | WO96/16521 | 5/1996 |

* cited by examiner

*Primary Examiner*—Thanh Cong Le
*Assistant Examiner*—Huy D Nguyen

(57) ABSTRACT

The present invention relates to an arrangement for improving the speech quality, especially for VoIP (Voice over IP) calls, which arrangement comprises a Transceiver and Rate Adapter Unit (TRAU) in which an encoded speech signal from a Mobile Station (MS) is transcoded, and for the purpose of reducing the necessary encoding/decoding for thereby avoiding detorioration of speech quality, and also for the purpose of avoiding reduction in bandwidth, it is according to the present invention suggested that said arrangement comprises means for either putting the TRAU in a transparent mode or letting the TRAU be bypassed altogether.

3 Claims, 2 Drawing Sheets

Signalling sequences for TFO over IP.

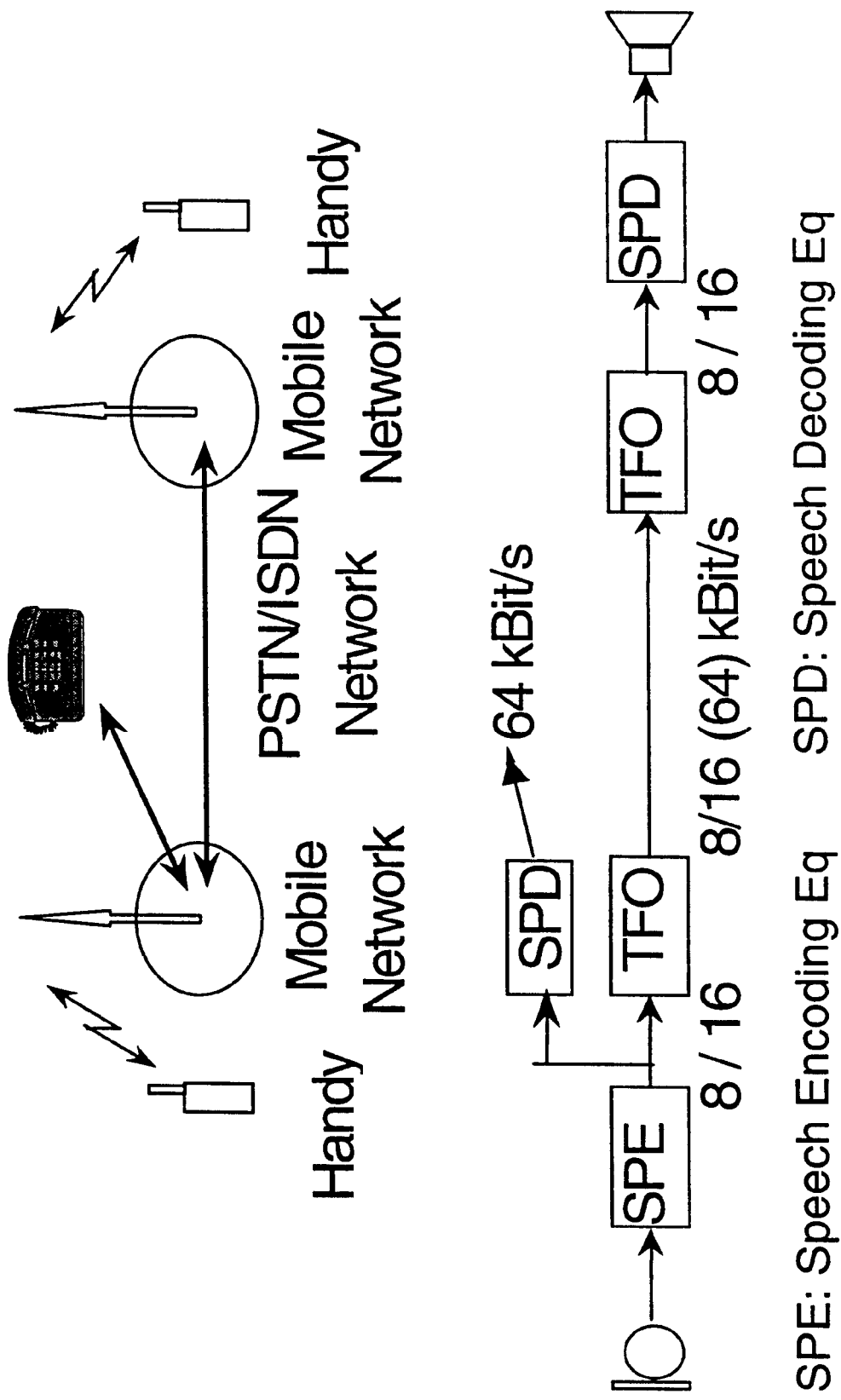
SPE: Speech Encoding Eq   SPD: Speech Decoding Eq
Figure 1 Principle of Tandem Free Operation.

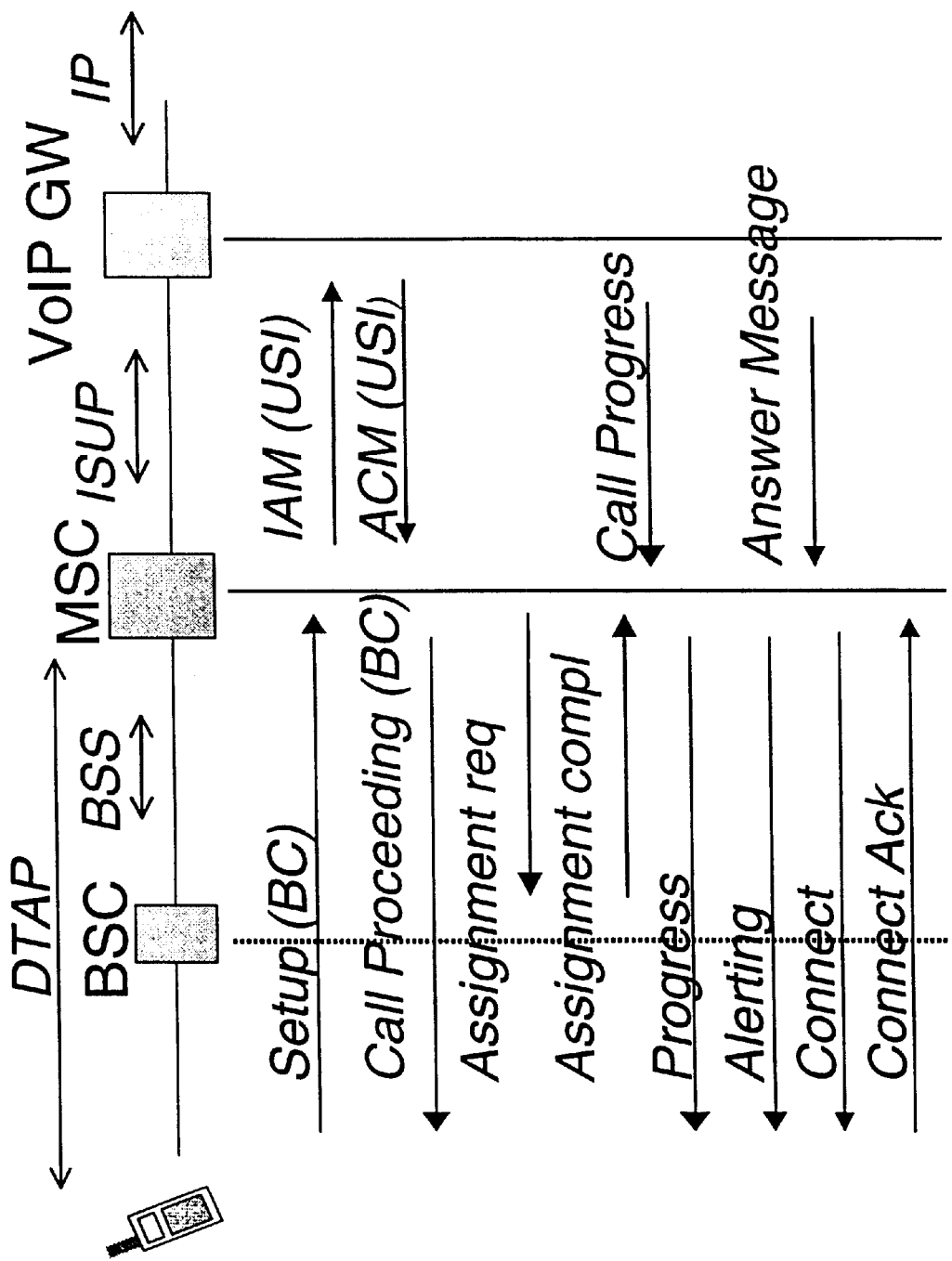
Figure 2 Signalling sequences for TFO over IP.

ARRANGEMENT FOR IMPROVING THE SPEECH QUALITY, ESPECIALLY FOR VOIP (VOICE OVER IP) CALLS

This application claims priority under 35 U.S.C. §§119 and/or 365 to 19991169 filed in Norway on Mar. 10, 1999; the entire content of which is hereby incorporated by reference.

FIELD OF THE INVENTION

The present invention relates to an arrangement for improving the speech quality, especially for VoIP (Voice over IP) calls, which arrangement comprises a Transceiver and Rate Adapter Unit (TRAU) in which an encoded speech signal from a Mobile Station (MS) is transcoded.

GENERAL BACKGROUND OF THE INVENTION

This is a proposal for how the speech quality can be enhanced for mobile VoIP calls. It is a well known problem that speech can be degraded for mobile calls when too many speech encodings/decodings are performed on the voice path.

There are mobile standards to overcome this for MS to MS calls, called Tandem Free Operation (TFO). The Japanese Personal Digital Cellular (PDC) system uses outband Mobile Application Part (MAP) signalling, called codec through. In Global System For Mobile Communication (GSM) there is an emerging standard, TS 04.53, while there is no TFO planned for Digital-Advanced Mobile Phone Service (D-AMPS).

These TFO standards were developed for MS to MS calls, and they do not address in an optimal way TFO over IP.

The solution described here has the following main benefits:

Improved speech quality for mobile VoIP calls compared to ordinary mobile calls

The impacts are local affecting only the MS-IP side of a MS-IP-MS call

The implementation uses outband standard #7 signalling (a standard in the CCITT Signalling system) and has minor impacts on the Mobile Switching Centre (MSC) and the Base Station Subsystem (BSS)

It can be used with all existing mobile voice codecs as long as they are supported by the IP network to which the gateway is connected Avoids the use of transceivers in Base Station Subsystem No need for speech coding and the use of Digital Signalling Processors (DSP) in the VoIP gateway Tandem Free Operation (TFO) in GSM In case of MS to MS calls in a mobile network without TFO, the speech signal is encoded within the first mobile station for transmission on the air interface, and transcoded within the first Tranceiver and Rate Adapter Unit (TRAU). The Pulse Code Modulation (PCM) samples are then transported within the fixed part of the network to the second TRAU using 64 kbit/s traffic links. The second TRAU encodes the speech signal a second time for the transmission on the second air interface. The two codecs of the connection are in "Tandem Operation".

This Tandem Operation has several disadvantages:

The extra encoding/decoding degrades the speech quality more than necessary

The links between the TRAUs need 64 kb/s while 16 or 8 kb/s would be sufficient

The unnecessary encoding/decoding within the TRAUs allocates Digital Signalling Processor (DSP) power The European Telecommunications Standards Institute (ETSI) is working on a standard for TFO, TS 04.53. This standard defines inband signals between TRAUs so that TFO effects only the TRAUs and are therefore fully compatible with existing equipment.

In FIG. 1 there is illustrated in a schematical manner, the principle of Tandem Free Operation (TFO), and in the following there will be give a brief description of this principle.

TFO in GSM is defined as an inband signalling protocol between two peer transceivers. It Tests the path for possible TFO Establishes the TFO connection Guarantees a fast fallback procedure Supports resolution of Codec mismatch The standard defines both TFO Frames (speech) and TFO messages. TFO Frames affects only the TRAUs.

For Half Rate Speech Coding (HR) the required bandwidth is 8 kbits/s using the Least Significant Bit (LSB) of each PCM sample and for Full Rate Speech Coding (FR) and Enhanced Full Rate Speech Coding (EFR) 16 kbits/s, using the two LSB of each PCM sample.

The speech quality is of special concern for a Mobile Switching Centre (MSC) based gateway. This is because of the number of encodings/decodings that can occur for IP based mobile calls.

For normal mobile calls we have the two following scenarios (using GSM as an example):

| | |
|---|---|
| MS -> PSTN: | GSM 06.10 - G.711 |
| MS -> MS: | GSM 06.10 - G.711 - GSM 06.10 |

When IP is a part of a call leg the following can happen when GSM 06.10 is used as the IP audio codec:

| | |
|---|---|
| MS -> IP -> PSTN: | GSM 06.10 - G.711 - GSM 06.1 - G.711 |
| MS -> IP -> MS: | GSM 06.10 - G.711 - GSM 06.1 - G.711 - 06.10 |

Each encoding/decoding deteriorates the speech quality. For MS to MS calls we can hear the quality we get with two encodings. Adding one encoding as would be the case for an MS→IP→MS call will probably reduce the speech quality to an unacceptable level. One way to avoid this is by choosing G.711 as the IP codec, but then no reduction in bandwidth is achieved, which should be one of the main goals with using IP.

OBJECTS OF THE INVENTION

A main object of the present invention is to improve the speech quality, especially for mobile VOIP calls, by reducing the encoding/decoding to a minimum for thereby avoiding deterioration of speech quality.

Another object of the present invention is to also reduce the bandwidth, especially when using IP.

Another object of the present invention is to adapt the associated gateway (GW) so as to be in harmony with this optimisation.

BRIEF SUMMARY OF THE INVENTION

The above objects are achieved in an arrangement as stated in the preamble, which according to the present invention is characterised by the features as stated in the enclosed patent claims.

In other words, the present invention suggests that the arrangement comprises means for either putting the TRAU in a transparent mode or letting the TRAU be bypassed altogether.

Further features and advantages of the present invention will appear from not only the enclosed patent claims, but also from the following description taken in conjunction with the enclosed drawings.

BRIEF DISCLOSURE OF THE DRAWINGS

FIG. 1 is a schematical diagram illustrating the principle of Tandem Free Operation (TFO).

FIG. 2 is a diagram illustrating the signalling sequences for TFO over IP.

DETAILED DESCRIPTION OF EMBODIMENTS

FIG. 1 is a schematical drawing illustrating the principle of Tandem Free Operation, and this principle has already been discussed on previous pages.

In FIG. 2 there is schematically illustrating signalling sequences for TFO over IP, these signalling sequences illustrating one of several embodiments wherein the general idea of the present invention has been implemented.

In the following there will be given a more detailed description of how this embodiment can be implemented.
TFO Over IP The basic idea of the present invention is that no decoding is done in the TRAU. The TRAU can either be put in transparent mode or it is bypassed all together.

The MS encodes the speech either in Half Rate Speech Coding (HR), Full Rate Speech Coding (FR) or Enhanced Full Rate Speech Coding (EFR) and the speech samples are transmitted directly on to the IP network where they are assembled into Realtime Transfer Protocol (RTP)/User Datagram Protocol (UDP) packets. For HR the LSB bit on PCM is used, and for FR and EFR the two LSB bits are used.

The VoIP GW has to perform some Error Concealment. This is anyhow a normal function of a VoIP gateway.

Preferably this can be handled by standard #7 signalling using standard parameters, possibly using spare fields.

On the DTAP/BSSMAP side the BC (Bearer Capability) field is used, which is read by the Mobile Switching Centre (MSC) and mapped transparent to the User Service Information (USI) field on ISUP towards the VoIP Gateway. BC contains two fields for negotiation during call set-up. If the GW does not support the preferred BC, the default is applied.

The preferred field could contain "TFO wanted", and the default field "no TFO". In BC two spare bits in octet 3a could be applied.

VoIP gateway must have the final decision on which codec to use since it must terminate the correct TRAU frames when TFO is active.

For an outgoing call using TFO we could have the following scenario:
1. The user dials prefix to the destination number to indicate that he wants the call to be routed over an IP network.
2. After b-number analyses the MSC modifies the BC in SETUP. The BC contains two BC fields, one is fallback and one is preferred. The preferred BC is encoded with "TFO wanted", and codec type.
3. The MSC transfers the modified BC fields to the USI field in the outgoing IAM towards the VOIP gateway. The gateway now decides TFO or not and reads the codec type. The answer is transferred back to the MSC in the ACM message.
4. The MSC uses ASSIGNMENT REQUEST to request the wanted radio resources from the BSC. Information requiring TFO could be coded in fields like Channel Type, Classmark or others.
5. If TFO can be supported by the BSC this is confirmed back to the MSC in ASSIGNMENT COMPLETE. The BSC puts the TRAU in either transparent mode or bypassed mode. The method chosen here is of local (BSC) relevance only.
6. The MSC continues the call setup with the relevant DTAP messages.
7. If TFO was not accepted by the VOIP gateway the call is handled like a "no TFO" call.

Note:
   In this scenario the codec type is decided by the gateway in case of TFO.
   Fallback from TFO during speech is not considered necessary in a basic implementation.
   For incoming TFO calls a reverse scenario applies. In case TFO is not supported by the BSC, or the MS does not support the incoming IP codec, the VOIP gateway must support fallback to G.711 speech.

| Abbreviations | |
|---|---|
| ACM | Address Complete Message |
| BSC | Base Switching Centre |
| BC | Bearer Capability |
| BSS | Base Station Subsystem |
| D-AMPS | Digital-Advanced Mobile Phone Service |
| DSP | Digital Signalling Processor |
| DTAP | Direct Transfer Application Part |
| ETSI | The European Telecommunications Standards Institute |
| EFR | Enhanced Full rate speech coding |
| FR | Full Rate speech coding |
| GSM | Global System for Mobile communication |
| GW | Gateway |
| HR | Half Rate speech coding |
| IAM | Initial Address Message |
| IP | Internet Protocol |
| ISUP | ISDN User Part |
| LSB | Least Significant Bit |
| MAP | Mobile Application Part |
| MS | Mobile Station |
| MSC | Mobile Switching Centre |
| PCM | Pulse Code Modulation |
| PDC | Personal Digital Cellular |
| PSTN | Public Switched Telephone Network |
| RTP | Realtime Transfer Protocol |
| SPE | Speech Encoding Eq |
| SPD | Speech Decoding Eq |
| TFO | Tandem Free Operation |
| TRAU | Tranceiver and Rate Adapter Unit |
| UDP | User Datagram Protocol |
| USI | User Service Information |
| VoIP | Voice over IP |
| ITU | (International Telecommunications Union, Geneva, Switzerland) formerly the CCITT (Consultative Committee for International Telephony and Telegraphy) is an international organization founded in 1865 and headquartered in Geneva that sets communications standards. |

What is claimed is:
1. A method of improving speech quality for a call in a mobile Voice over IP (VoIP) network, said method comprising the steps of:
   sending a first call setup-type message from an originating mobile station (MS) to a mobile switching center

(MSC), said call setup message including a bearer capability parameter;

performing a called number analysis by the MSC to determine a VoIP gateway for call routing;

determining by the MSC, whether Tandem Free Operation (TFO) is desired for the call;

sending a second call setup-type message from the MSC to the determined VoIP gateway, said second call setup-type message including a bearer capability field that is divided into a preferred field and a default field, the MSC setting the preferred field and inserting a codec type utilized by the originating MS when TFO is desired, and the MSC setting the default field when TFO is not desired;

determining in the VoIP gateway whether or not to utilize TFO;

sending an answer message from the VoIP gateway to the MSC indicating whether TFO is being utilized;

requesting by the MSC, required radio resources from a Base Station Controller (BSC) serving the originating MS, said BSC including a Transceiver and Rate Adapter Unit (TRAU) that transcodes an encoded speech signal from the originating MS if TFO is not being utilized;

notifying the BSC whether TFO is being utilized;

completing call setup;

transmitting the encoded speech signal from the originating MS to the BSC;

if TFO is not being utilized, transcoding the encoded speech signal from the originating MS in the TRAU prior to sending the signal from the BSC to the MSC, said transcoded speech signal being transmitted to the VoIP gateway where the signal is assembled into packets; and if TFO is being utilized, bypassing the TRAU, and sending the encoded speech signal from the BSC to the MSC without transcoding, said encoded speech signal being transmitted to the VoIP gateway where the signal is assembled into packets.

2. The method of claim 1 wherein the step of transmitting the encoded speech signal from the originating MS to the BSC includes encoding the speech signal in the MS either in Half Rate Speech Coding (HR), Full Rate Speech Coding (FR), or Enhanced Full Rate Speech Coding (EFR), and wherein the encoded speech signal is assembled in the VoIP gateway into Real Time Transfer Protocol (RTP)/User Datagram Protocol (UDP) packets.

3. The method of claim 2 further comprising performing error concealment in the VoIP gateway utilizing spare fields in Signaling System 7 (SS7). message parameters.

* * * * *